United States Patent [19]

Truchet

[11] Patent Number: 5,090,448

[45] Date of Patent: Feb. 25, 1992

[54] CONNECTION FOR PIPES OF THE TYPE INCORPORATING ROTATING VALVES

[75] Inventor: Gaston Truchet, Faverges, France

[73] Assignee: S.A. Des Etablissements Staubli (France), Faverges, France

[21] Appl. No.: 650,428

[22] Filed: Feb. 4, 1991

[30] Foreign Application Priority Data

Feb. 8, 1990 [FR] France ............... 90 01709

[51] Int. Cl.[5] ............................................. F16L 29/00
[52] U.S. Cl. ........................... 137/614.03; 251/149.2
[58] Field of Search ............. 137/614, 614.02, 614.01, 137/614.05, 614.06, 614.03; 251/149.2

[56] References Cited

U.S. PATENT DOCUMENTS

| | | | |
|---|---|---|---|
| 3,078,068 | 2/1963 | Romney | 251/149.2 |
| 3,276,474 | 10/1966 | Gill | 137/614.03 |
| 3,279,497 | 10/1966 | Norton et al. | 251/149.2 X |
| 3,618,892 | 11/1971 | Sciuto, Jr. | 251/149.2 |
| 4,181,149 | 1/1980 | Cox | 251/149.2 X |
| 4,445,664 | 5/1984 | Allreud | 251/149.2 |
| 4,473,211 | 9/1984 | Fremy | 251/149.2 |
| 4,627,598 | 12/1986 | Fremy | 251/149.2 |
| 4,664,149 | 5/1987 | Fremy | 137/614.06 |

*Primary Examiner*—John C. Fox
*Attorney, Agent, or Firm*—Dowell & Dowell

[57] ABSTRACT

A connector for pipes including opposing body portions having bifurcated valve seats in which rotary valves are pivotally mounted by opposing pins extending from the valve seats so that the valves are automatically pivoted to an open alignment upon closure of the connector and are automatically pivoted to a closed position upon opening of the connector.

4 Claims, 4 Drawing Sheets

CONNECTION FOR PIPES OF THE TYPE INCORPORATING ROTATING VALVES

BACKGROUND OF THE INVENTION

1. Field of the Invention

The present invention relates to connection devices for the removable union of pipes and more particularly to connections of the type incorporating rotating valves.

2. History of the Related Art

Devices of this type are known to comprise two elements which are fixed to the ends of the pipes to be connected, being provided with means for allowing assembly and disassembly thereof. Inside each element is mounted a valve of substantially spherical profile, which valve includes a through bore oriented parallel to the axis of the connection. This valve is mounted to pivot in the body of the element in question with the aid of a transverse pivot which is offset with respect to the center of the valve, so that, by thrust during assembly of the two elements of the connection, the valve pivots against elastic means in order to pass from a closed position in which its bore is oriented in substantially transverse manner, to an open position in which the axes of the bore and of the connection merge.

In conventional constructions, the pivot of the valve is generally constituted by two pins which are carried by the head of a tubular shank oriented axially so that the head is engaged inside the bore of the valve and the pins cooperate with recesses made in the wall of the bore. In addition, means are provided on the head of the axial tubular shank, for ensuring correct guiding of the valve during the pivoting thereof.

It will be readily understood that such an arrangement necessarily involves a relatively complicated construction and fairly difficult assembly operations, which results in a substantial increase in the cost of the connection. Furthermore, the presence of the axial shank and of the pivot pins inside the bore of the valve obviously hinders the cleaning operations which necessitate complete dismantling of the parts constituting the connection.

SUMMARY OF THE INVENTION

It is a principal object of the present invention to overcome these drawbacks by ensuring the valves pivot to an open position at the same time as they are guided inside the body of each element of the connection, with the aid of a pivot formed by two lateral pins which cooperate with enlarged openings made on the one hand in the outer wall of the valve, on the other hand in bores in inner face of the arms which extends outwardly of the body.

It will be readily appreciated that a much simplified construction is thereby obtained, which in addition allows the space inside the connection to be cleaned by passage of a stream of liquid without any dismantling since the fluid which passes through the connection in normal use only comes in contact with the inner wall of the bore of each valve.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
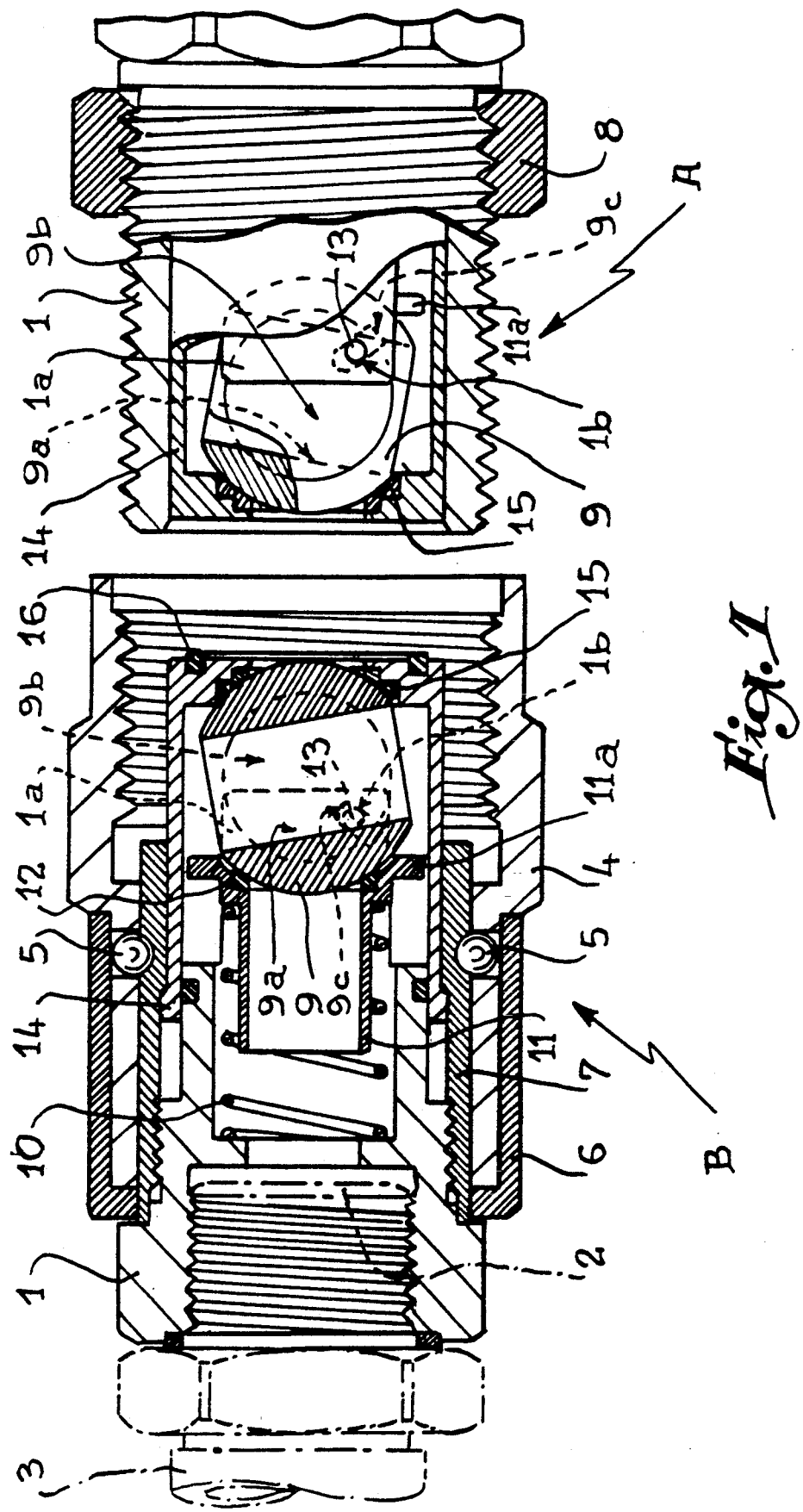
FIG. 1 is a schematic axial section of a connection incorporating rotating valves according to the present invention.
Figure 2:
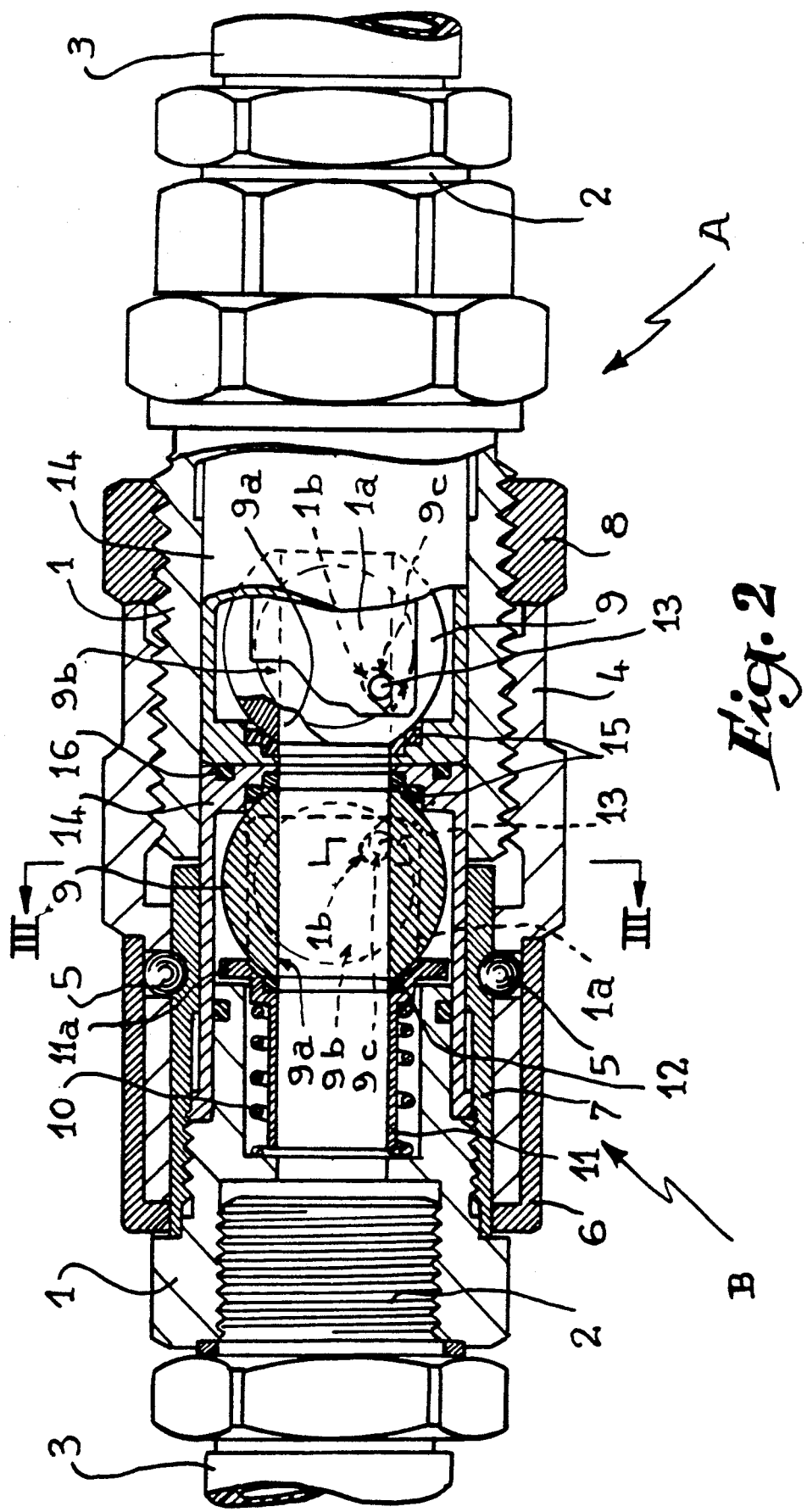
FIG. 2 reproduces FIG. 1 after assembly of the two elements constituting the device for connecting the pipes in question.
Figure 3:
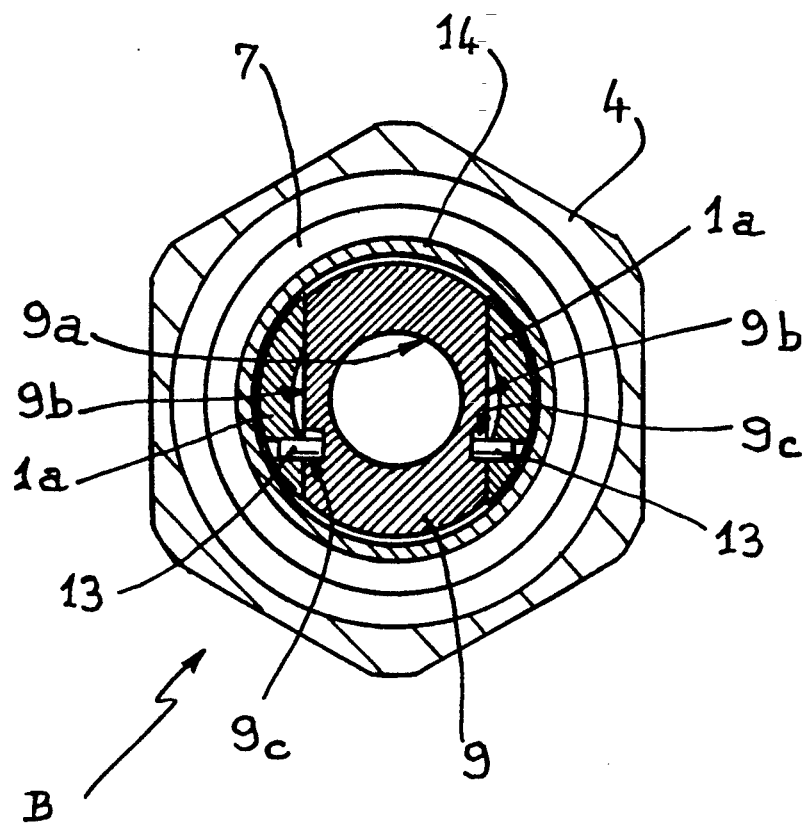
FIG. 3 is a transverse section along the plane III—III in FIG. 2.

Referring now to the drawings, the connection shown in FIGS. 1 and 2 is constituted in conventional manner by two elements A and B adapted to be fixed to the ends of the pipes to be connected and to be selectively assembled to each other. Each of these elements comprises a tubular body 1 of which the rear part is adapted to receive, by screwing in the present case, a joining piece 2 secured to a flexible pipe 3.

Any known system may be used for assembling the two elements A and B. In the embodiment shown, it has been assumed that the body 1 of the element A was provided to be threaded into a rotating ring 4 retained axially on the element B by balls 5 maintained between an outer sleeve 6 and secured to ring 4 and an inner sheath 7 screwed on the body 1 of element B; any risk of untimely unscrewing of the ring 4 is prevented by a counter-nut 8 carried by element A.

Figure 4:
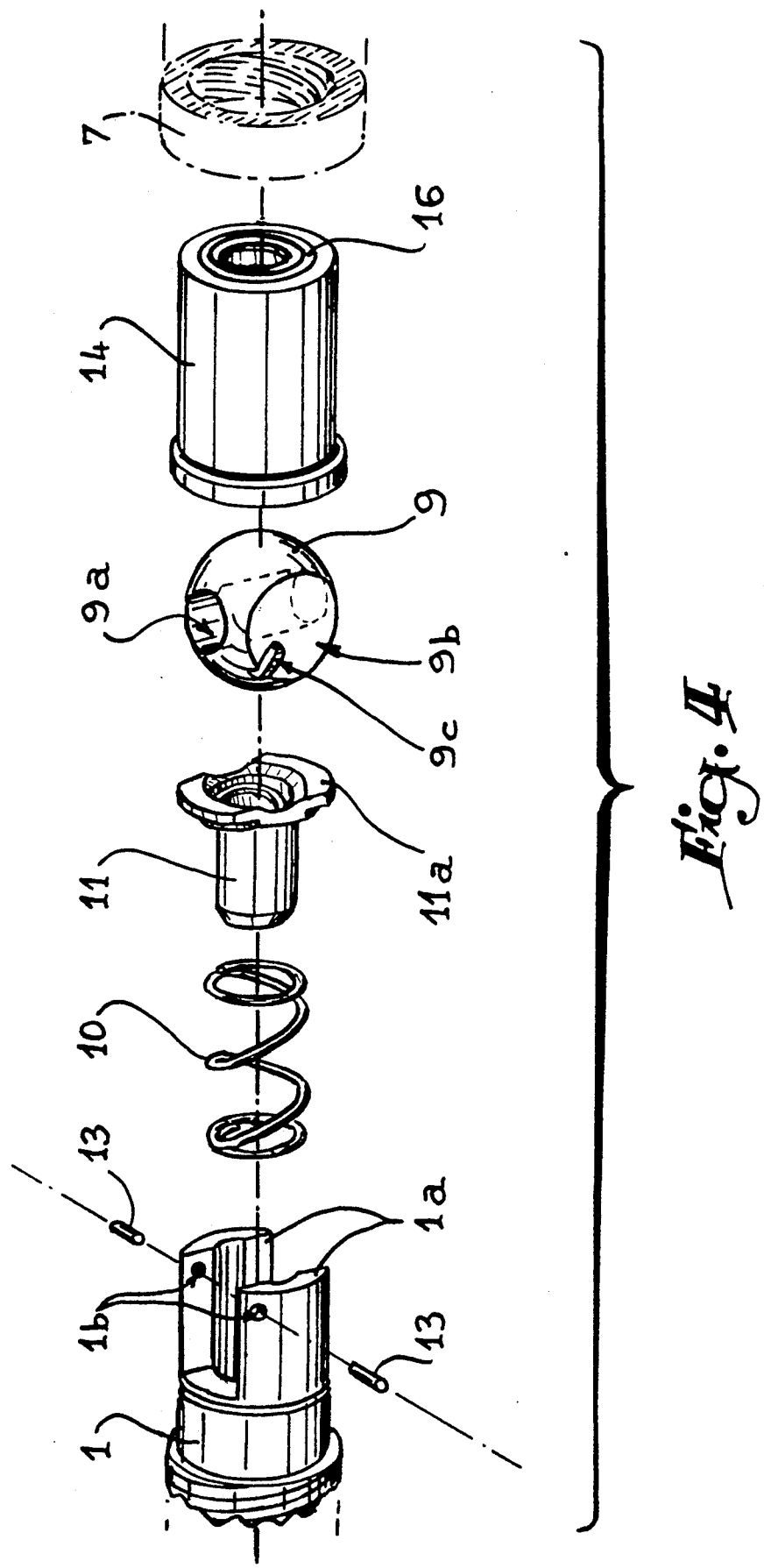
FIG. 4 shows in perspective, prior to being mounted in the body and to assembly thereof, the principal parts constituting one or the other of the two elements of the connection.

Inside the body 1 of each element A and B is mounted a rotating valve 9 of substantially spherical profile, the valve being provided with a bore 9a. FIG. 4 shows particularly well the mode of mounting each valve 9 in the corresponding body 1.

As shown, the body 1 includes an axial extension which includes a bifurcated semi-cylindrical arms, between the two longitudinal arms 1a of which are engaged a spring 10 and a piston 11; the end of the piston which faces the valve 9 widens at 11a to receive an O-ring 12 (FIG. 1) which the spring 10 maintains firmly applied against the valve 9. The valve includes two plane outer faces 9b (FIG. 4) oriented parallel to each other and of which each includes a recess 9c of elongated profile along a diagonal of the face in question; in each recess 9c is engaged the end of a transverse pin 13 which is secured with one of the arms 1a by introduction into a bore 1b.

It should be observed that the bores 1b are offset laterally with respect to the median axis of each of the arms 1a. In the same way, the recesses 9c are offset on the plane faces 9b with respect to the center thereof, with the result that the two pins 13 define for each valve 9 an out-of-center pivot such that, when the valve receives a thrust effort oriented longitudinally from front to rear, it pivots by rotation to pass from the position of closure according to FIG. 1 to the open position according to FIG. 2.

The thrust effort is exerted by a tubular pusher 14 which slides axially on the axial bifurcated extension of the body 1 of each element A or B. Each pusher 14 comprises an inner O-ring 15 against which is tightly applied valve 9 under the effect of spring 10. Furthermore, it will be noted that one of the two pushers 14 (namely the one mounted inside element B in the present case) is provided with an O-ring 16 fixed against the transverse outer wall or bottom of the pusher, so as to bear against the smooth bottom of the pusher 14 of element A during assembly of the two elements A and B, consequently ensuring a sealing of the connection.

The uncoupled position shown in FIG. 1 will be the starting point for describing the operation of the device described hereinabove. For assembling the two elements A and B, the male element A is engaged in the front opening of ring 4; during mutual screwing of the two elements, the bottoms of the two pushers 14 come into contact with each other, with the result that the pushers are repelled axially. Each of the two valves 9 is itself pushed inwardly by its pusher 4, so that, due to the offset of the pivot formed by the two pins 13, it is obliged to pivot. The assembled position illustrated in FIG. 2 is finally obtained, the two valves 9 thus being brought into open position for which the two bores 9a are oriented along the axis of the device.

Sealing during assembling is ensured by the O-rings 12 and 15 which, under the effect of the spring 10 acting on the piston 11 associated with each valve 9, are maintained in permanent contact with the spherical outer wall thereof. Disassembly of the two elements of the connection involves only the disconnection of the two elements A and B, the valves 9 returning into position of closure under the effect of springs 10.

The construction of such a connection is very simple, the mounting operations being able to be carried out without particular difficulty. Moreover, it will be observed that, in the coupled position according to FIG. 2, the fluid which passes through the connection comes into contact only with the inner wall of the bores 9a of the valves 9, with the result that the device may be cleaned simply by passage of a stream of liquid, without any dismantling.

It goes without saying that the recesses 9c made on the plane outer faces 9b of each valve 9 may present a circular profile of diameter greater than that of the pins 13, instead of the diagonally elongated profile illustrated in FIG. 4.

It must, moreover, be understood that the foregoing description has been given only by way of example and that it in no way limits the domain of the invention which would not be exceeded by replacing the details of execution described by any other equivalents.

What is claimed is:

1. A valved connection for pipes comprising, first and second connector elements having tubular body portions from which a pair of bifurcated arms extend so as to be in spaced relationship to one another, said first and second connector elements being aligned along a primary axis, a valve member mounted between said spaced arms of each of said first and second connector elements, each valve member having a bore therethrough and opposing generally planar sidewalls having recesses formed therein, said recesses being formed in offset relationship with a transverse axis taken with respect to said bores through said valve members, opposing pivot means mounted to said arms and extending into said recesses in said opposing side walls of said valve members and being slidable along said recesses as said valve members are rotated, a slidable pusher element for engageably retaining each of said valve members within each of said spaced arms, means for connecting said first and second connector elements in axial alignment so that said pusher elements are simultaneously engaged and moved against said valve members thereby rotating said valve members about said pivot means to align said bores of said valve members with said primary axis.

2. The valved connection of claim 1 including a hollow piston means mounted between said body portions and said valve members of said first and second connector elements, resilient means retained between said arms of each of said first and second connector elements for urging said piston means toward said valve members, and first seal means carried by each of said piston means for selectively engaging said valve members in sealing relationship therewith.

3. The valve connection of claim 2 in which each of said pusher elements includes second seal means for engaging each of said valve members on a side opposite to said first seal means carried by said piston means.

4. The valve connector of claim 3 including a third seal means disposed between said pusher elements for sealing said pusher elements with respect one another as said pusher elements are simultaneously engaged as said first and second connector elements are connected.

* * * * *